United States Patent [19]

Lohnes et al.

[11] Patent Number: 5,338,568
[45] Date of Patent: Aug. 16, 1994

[54] ADDITIVE FOR TWO COMPONENT EPOXY RESIN COMPOSITIONS

[75] Inventors: Steven A. Lohnes; Francis R. Crowne, both of Ontario, Canada

[73] Assignee: Cappar Ltd., Brampton, Canada

[21] Appl. No.: 972,060

[22] Filed: Nov. 5, 1992

Related U.S. Application Data

[60] Continuation of Ser. No. 610,723, Nov. 7, 1990, abandoned, which is a division of Ser. No. 307,869, Feb. 8, 1989, abandoned.

[51] Int. Cl.$^5$ .......................... B32B 35/00; B05D 5/10
[52] U.S. Cl. ...................................... 427/136; 427/140
[58] Field of Search ............ 427/136, 140, 386, 393.6, 427/387

[56] References Cited

U.S. PATENT DOCUMENTS

| | | | |
|---|---|---|---|
| 2,728,744 | 12/1955 | May et al. | 528/110 |
| 2,731,444 | 1/1956 | Greenlee | 528/97 |
| 2,928,810 | 3/1960 | Belanger | 528/93 |
| 2,935,488 | 5/1960 | Phillips et al. | 528/112 |
| 2,943,953 | 7/1960 | Daniel | 427/140 |
| 2,947,717 | 8/1960 | Belanger et al. | 528/110 |
| 2,982,752 | 5/1961 | Phillips et al. | 528/112 |
| 3,689,305 | 9/1972 | Hausmann | 427/386 |
| 3,850,661 | 11/1974 | Dreher et al. | 427/136 |
| 3,894,686 | 7/1975 | Weinberg et al. | 427/408 |
| 3,993,707 | 11/1976 | Cummings | 528/120 |
| 4,113,691 | 9/1978 | Ward | 427/214 |
| 4,141,187 | 2/1979 | Graves | 219/213 |
| 4,141,737 | 2/1979 | Moon et al. | 427/136 |
| 4,231,951 | 11/1980 | Smith et al. | 556/80 |
| 4,555,412 | 11/1985 | Günter et al. | 427/386 |
| 4,612,214 | 9/1986 | Salvi | 427/136 |
| 4,716,051 | 12/1987 | Rödder | 427/136 |
| 4,828,879 | 5/1989 | Sellstrom et al. | 427/136 |
| 4,857,608 | 8/1989 | Herzig et al. | 427/387 |
| 4,981,728 | 1/1991 | Homma et al. | 427/387 |
| 5,061,524 | 10/1991 | Hinterwaldner | 427/387 |

FOREIGN PATENT DOCUMENTS 627835 9/1961 Canada ................................ 427/140

Primary Examiner—Shrive Beck
Assistant Examiner—Diana Dudash
Attorney, Agent, or Firm—Ernest G. Szoke; Wayne C. Jaeschke; Henry E. Millson, Jr.

[57] ABSTRACT

The invention provides a glycol additive for two component resin compositions which are particularly useful as concrete crack sealants. The glycol additive is selected from the group consisting of glycerine, ethylene glycol, diethylene glycol and triethylene glycol and can be included in either the resin or hardener component.

20 Claims, No Drawings

ADDITIVE FOR TWO COMPONENT EPOXY RESIN COMPOSITIONS

This application is a continuation of application Ser. No. 07/610,723 filed on Nov. 7, 1990 which is a division of 07/307,869 filed on Feb. 8, 1989, both now abandoned.

BACKGROUND OF THE INVENTION

1. Field of the Invention

This invention relates to novel additives for two component epoxy resin compositions. The invention also extends to a method of filling cracks or joints in concrete with the two component epoxy resin.

2. Description of Related Art

Epoxy resin compositions are well known. They contain the reactive oxirane ring structure:

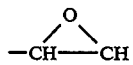

commonly called epoxy. Liquid epoxy resins are commonly converted, through reaction at the reactive epoxy sites into tough, insoluble and infusible solids having wide applications. The liquid epoxy resin is typically provided as part of a two component system, component A containing the liquid epoxy resin, hereinafter termed the resin component, and component B containing the liquid hardener or curing agent, hereinafter termed the hardener component. When mixed together, these components form a pasty resin composition which cures to a flexible or inflexible solid, depending on the particular resin, curing agent and additives employed.

Of the known liquid epoxy resins the most common include those prepared by the condensation of a lower alkylidene-diphenol such as bisphenol A, with an epihalohydrin such as epichlorohydrin in conjunction with sodium hydroxide to form a his (epoxyloweralkoxy-phenol) lower alkane or derivative thereof. Lower as used herein throughout the disclosure and claims with alkoxy or alkane or alkylidene refers to $C_{1-4}$ units. The most common epoxy resin useful in this invention is that formed from bisphenol A and epichlorohydrin to form 2, 2 -bis [4-(2'3'epoxypropoxy) phenyl] propane, also termed a diglycidyl ether of hisphenol A, which has a typical molecular weight of about 400 daltons. Higher molecular weight homologs of these resins which introduce further reactive sites with additional hydroxyl groups are well known.

Epoxy resins of the type just discussed with molecular weights of about 1000 daltons or greater generally have high viscosities and high solids contents, both of which can limit applications for their use. Use of such resins as sealants is limited because of high viscosities. The term sealant as used herein refers to a resin with utility to fill cracks or joints in a cementitious substrate.

Additives have heretofor been suggested for inclusion in the manufacture of epoxy resins in order to lower the resin viscosity. U.S. Pat. No. 2,901,462 issued Aug. 25, 1959 to Anderson et al, and U.S. Pat. No. 3,145,191 issued Aug. 18, 1964 to Perfetti are exemplary. However, such additives are incorporated during the condensation reaction complicating the manufacture of the epoxy resin itself. It is also known to add solvents such as methyl ethyl ketone or xylene to an epoxy resin to lower the resin viscosity. While the inclusion of the solvent might improve penetration of the resin through the lowered viscosity, the cured resin composition includes voids due to evaporation of the solvent. In fact, none of the above solutions, to the inventors knowledge, provides an epoxy resin composition which can penetrate into cracks or joints in a substrate such as concrete, particularly when the cracks are very fine and deep, while also being able to adhere and cure below the surface and within these deep cracks.

There is a particular need for a crack sealant having good penetration and adherence qualities for concrete substrates. In past years, corrosion to the steel reinforcements in concrete from salt applied to melt winter ice has become a major problem. A sealant for concrete which will penetrate into joints and cracks to limit or prevent such corrosion is desired.

SUMMARY OF THE INVENTION

Unless indicated otherwise, all numbers expressing quantities of ingredients or reaction conditions are to be understood as modified by the term "about". All quantities of ingredients, unless indicated otherwise are understood to be percentage weight.

The present invention provides an epoxy resin composition, comprising, in admixtures:
  i) a liquid epoxy resin of the bis (epoxyloweralkoxyphenyl) lower alkane-type, resulting from the condensation of a lower alkylidene-diphenol with an epihalohydrin; and
  ii) at least one glycol additive selected from the group consisting of glycerine, ethylene glycol, diethylene glycol and triethylene glycol; and
  iii) at least one curing agent with functional groups capable of effecting cross-linking of the oxirane groups present in the epoxy resin.

The term glycol additive, as used herein, is meant to include glycerine even though, strictly speaking, the term glycol is commonly used in the art to refer only to dihydric alcohols.

In general, the glycol additive of this invention can be incorporated into either or both of the resin or hardener components. However, as will be mentioned hereinafter, when the epoxy resin composition is intended as a sealant for concrete, a silane additive may be included in either the resin or hardener component to improve adhesion to damp concrete. Since the glycol additive can react with silane, the glycol additive in such instances is preferably included in the component which does not contain the silane additive.

The preferred epoxy resins are the diglycidyl ethers of bisphenol A or bisphenol F resulting from reaction of bisphenol A or bisphenol F with epichlorohydrin. Most preferably, the resin includes a reactive diluent selected from the group consisting of mono, di or tri-functional glycldyl ethers which reduces the viscosity of the liquid epoxy resin. Generally, with such resins, the glycol additive provides excellent penetration and adherence when included in an amount of about 1 to 10 weight percent. The most preferred glycol additive is glycerine.

Preferred curing agents are those of the polyamine-type generally known in the art. These include aliphatic (including cyclo-aliphatic) primary or secondary amines, alcohol amines, polyalkylene amines, aromatic amines, polyether amines, polyamides, amido amines and mixtures of these amines .

Other additives preferably included with the curing agent in the hardener component are one or more accelerators, for example $C_{7-12}$-alkylphenols and/or, bisphenol A, and water scavengers, for example MgO. While not being bound by the same, it is believed that the hydroxyl groups present on the accelerator further improve the ability of the epoxy resin composition to adhere in substrate cracks or joints. Preferably, the curing agent will constitute 70–100% wt, the accelerator and bisphenol A combined 0–30% wt and the water scavenger 0–0.5% wt. If a silane additive is included, it is preferably included in an amount of about 2–10% wt. In the event that the glycol additive is included in the hardener, it is included in an amount sufficient to provide an amount of about 1 to 10% wt in the final epoxy resin composition, and the silane additive is omitted, or is included in the resin component.

The invention also extends to a method of filling cracks or joints in concrete, comprising applying to the area to be filled, a two component epoxy resin composition containing the above-mentioned liquid epoxy resin and curing agent in admixture, wherein one or both of the resin or hardener components includes the glycol additive of the present invention.

DESCRIPTION OF THE PREFERRED EMBODIMENTS

An epoxy resin composition of this invention preferably includes the following ingredients in the amounts indicated:

A) Resin Component:
  i) Liquid epoxy resin—50–99% wt; most preferably 60–80% wt;
  ii) Reactive diluent—0–20% wt, most preferably 10–20% wt;
  iii) Modifier—0–30% wt, most preferably 10–30% wt; and
  iv) Glycol Additive—1–10% wt, most preferably 3–8% wt.

B) Hardener Component:
  i) Curing Agent—60–100% wt, most preferably 70–90% wt;
  ii) Accelerators—0–30% wt, most preferably $C_{7-12}$-alkyl phenols-4–10% wt and bisphenol A- 10–20% wt;
  iii) Silane Additive—0–10% wt, most preferably 2–7% wt; and
  iv) Water Scavenger—0–0.5% wt, most preferably 0.1–0.5% wt.

In the event that the glycol additive is included in the hardener component, the silane additive is omitted and the glycol additive is included in an amount to provide about 1–10% wt in the final epoxy resin composition, the other ingredient amounts being adjusted accordingly. Typically, the glycol additive will comprise about 10–30% wt of the hardener component.

The ratio of resin component to hardener component will vary according to the particular ingredients employed, however it will typically be between about 2:1 and 4:1.

Due to commercial availability, the most preferred liquid epoxy resins are diglycidyl ethers of bisphenol A or bisphenol F resulting from the condensation of bisphenol A or bisphenol F with epichlorohydrin. Exemplary bisphenol A and bisphenol F resins are available from The Dow Chemical Company under the trade marks D.E.R. 331 and D.E.R. 351 and 352.

To lower the viscosity of the liquid epoxy resin, a reactive diluent is preferably included in the liquid epoxy resin. These reactive diluents are known in the art and resins are commercially available which incorporate these diluents. In general, these reactive diluents are mono, di or tri-functional glycidyl ethers, for example prepared by condensing an epihalohydrin with various aliphatic and aromatic polyethers. A large number of these reactive diluents are available from Wilmington Chemical Coporation under the trade mark Heloxy. Exemplary are WC-7—a $C_{8-10}$-alkyl glycidyl ether; WC-8—a $C_{12-14}$-alkyl glycidyl ether; WC-9—a $C_{12-13}$-alkyl glycidyl ether; WC-61—a butyl glycidyl ether; WC-62—a cresyl glycidyl ether; WC-63—a phenyl glycidyl ether; WC-64—a nonylphenyl glycidyl ether; WC-65—a p-tert-butyl-phenyl glycidyl ether; MK-116—a 2-ethylhexyl glycidyl ether; WC-67—a diglycidyl ether of 1,4-butanediol; WC-68 a diglycidyl ether of neopentyl glycol; MK-107—a diglycidyl ether of cyclohexane dimethanol; WC-69—a diglycidyl ether of resorcinol; WC-97—a triglycidyl ether of trimethylol propane; and WC-98—a triglycidyl ether of trimethylol ethane.

A preferred liquid epoxy resin for use in the present invention is available from The Dow Chemical Company under the trade mark D.E.R. 324. This resin is of the bisphenol A type mentioned above, but includes about 17% wt of the reactive diluent WC-8, defined above.

A further preferred additive in the resin component is a modifier of the polyglycol diepoxide resin type which, when blended with the resin ingredients mentioned above, imparts flexibility, elongation and improved impact resistance. This modifier additive also serves as a viscosity reducer. Exemplary and preferred modifier additives are available from The Dow Chemical Company under the trade mark D.E.R. 732 and 736.

Particularly preferred curing agents are polyoxyalkyleneamines, for instance polyoxypropyleneamine, aliphatic amines such as diethylenetriamine (DETA) or triethylenetetramine (TETA), aminoalkyl piperazines such as n-aminoethylpiperazine (NAEP). A number of polyoxyalkyleneamines, particularly polyoxypropyleneamines, are available from Texaco Chemical Company under the trademark Jeffamine. Jeffamine D-230 is particularly preferred and is represented by the formula:

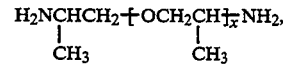

wherein x is approximately 2.6. Also preferred is Jefferson EDR 148 (trade mark of Texaco Chemical Company), which is a triethylene glycol aliamine.

A number of other exemplary and preferred curing agents are available from Henkel Corporation under the following trade marks: Gensmid 151 or 601CE - amido amines, Versamid 115 or 115CE - polyamides, Versamine C31 or 671CE - cycloaliphatic polyamines, and Versamine 908 or 640CE - alipbatic polyamines.

While any of the above curing agents may be used alone, most preferably, the hardener component includes a mixture of curing agents. One particularly preferred combination which has been found to be useful when the epoxy resin composition is used with concrete, includes a polyoxypropylene amine, DETA, TETA, NAEP and an amido amine such as Gensmid 151.

To improve adherence to concrete surfaces, particularly wet or damp concrete surfaces, the epoxy resin composition of this invention preferably includes a silane additive. Silane additives for this purpose are known in the art for inclusion in either the resin component or the hardener component. Exemplary of a silane additive for inclusion in the hardener component is Silane A-1120 available from Union Carbide. Exemplary of silane additives for inclusion in the resin component are γ-methacryloxypropyl trimethoxy silane, β-(3,4-epoxycyclohexylethyl trimethoxy silane and γ-glycidoxypropyl trimethoxy silane.

Water scavenger agents such as magnesium oxide may be included in the hardener or resin components to prevent the silane from reacting with itself. In general, the water scavenger is not needed if other ingredients in the epoxy resin composition are dry.

As is common in two component epoxy resins, one or more accelerators are preferably included in the hardener component to decrease the cure time for the mixed composition. Such accelerators function as catalysts in the cross-linking reaction. Exemplary and preferred are alcoholic or phenolic hydroxyl-containing compounds, for instance, $C_7$–$C_{12}$ alkyl phenols. Particularly preferred are nonyl phenol and bisphenol A. Without being bound by the same, it is believed that the hydroxyl groups of the accelerator cooperate with the glycol additive of this invention to improve the adherence of the composition in cracks and joints in a substrate such as concrete.

The invention is further illustrated by the following non-limiting examples.

EXAMPLE 1

To demonstrate that epoxy resin compositions according to the present invention are capable of both penetrating and adhering in deep concrete cracks, four resin compositions set forth below were formulated and applied to 4"×4" concrete cubes which had been cracked, with cracks varying in size between 20 thousands of an inch (thou) at the top to 6 thou at the bottom. The sides and bottom portion were sealed with wax and a small reservoir was created at the top. The resins were mixed with a red dye and ponded at the top of the crack.

RESIN 1

| Resin Component - Dow D.E.R. 324 | 100% wt |
|---|---|
| Hardener Component - | |
| (a) Hardener 1432-B, detailed below | 44% wt |
| NAEP | 7.97% wt |
| TETA | 15.46% wt |
| DETA | 7.97% wt |
| Genamid 151 | 22.20% wt |
| Jeffamine D-230 | 25.19% wt |
| Bisphenol A | 16.70% wt |
| Nonyl Phenol | 4.51% wt |
| (b) Jeffaine D-230 | 44% wt |
| (c) Glycerine | 12% wt |

The 1432-B hardener was prepared by mixing and heating together the aliphatic and amido amines to 120° C., adding bisphenol A, then cooling and adding the nonyl phenol and Jeffamine D-230.

Ingredients (a) (b) and (c) of the hardener were mixed together in the amounts indicated.

The resin and hardener components were mixed in a ratio of 78:22 by weight and the gel time for 200 g at 25° C. was 70 min.

RESIN 2

| Resin Component - Dow D.E.R. 324 | 100% wt |
|---|---|
| Hardener Component - NAEP | 100% wt |

The components were mixed in a ratio of 82:18 by weight and the gel time for 200 g at 25° C. was 24 min.

RESIN 3

This resin was prepared as Resin 1, but without the glycerine additive. The components were mixed in a ratio of 80:20 by weight and the gel time for 200 g at 25° C. was 85 min.

RESIN 4

This resin was prepared as Resin 2 with 12% wt of glycerine being added to the NAEP curing agent. The components were mixed in a ratio of 80:20 and the gel time for 200 g at 25° C. was 22 min.

After the resins had cured, 3" cores were removed from the blocks and examined. Resin 1 totally filled the core and all small air voids adjacent the cracks. This resin composition had totally filled the cracks rather than simply draining through the block, demonstrating the ability of this composition, with the glycerine additive to both penetrate and adhere in deep cracks. Resin 3, which was Resin 1 without the glycerine additive, showed, on examination of the core that, although the resin composition would penetrate into the cracks, a major amount drained from the cracks without adhering in and filling the crack. Only about 60% of the cracks were filled. Resin 4 gave results similar to Resin 1, with about 70% filling of the cracks. Resin 1, which included the more preferred mixture of curing agents and accelerators, was superior to Resin 4 in adhering in the cracks. Resin 2, which was Resin 4 without the glycerine additive, quickly drained from the cracks in the core leaving the top two thirds of the cracks containing virtually no resin, with only about 30% filling of the cracks.

These results demonstrate that, without the glycol additive of this invention, the epoxy resin composition will penetrate but will not adhere in and fill cracks in the concrete.

Examination of the cores filled with Resin 1 showed penetration and adherence into cracks as wide as 16–20 thou and as small as 2 thou. Air voids as large as 60 thou were also filled by Resin 1.

Screening tests conducted in accordance with the procedure set out in Example 2 suggest that an epoxy resin composition similar to Resin 1, but which eliminates the additional jeffamine D230 (ingredient (b) set forth above) from the hardener component, provides even better ability to adhere in and fill concrete cracks and joints.

EXAMPLE 2

A screening test was developed to approximate a concrete substrate and test the ability of a resin composition to both penetrate and adhere to that substrate. The test consisted of pouring 15 g of the epoxy resin composition to be tested onto an uncured mixture of a cementitious mixture comprising 1 part masonry cement and 2 parts sand (sieve analysis as follows with percent passing of #4 - 100%, #8 - 100%, #16 - 95-100%, #30 - 90-100%, #50 - 40-60%, #100 - 5-10%, and #200 - 0-2% ). The weight of the mixture picked up by the resin after a cure time of 24 hrs at ambient temperature was determined . While resins which picked up a large quantity of the mixture demonstrate good penetration abilities, the higher weight values demonstrate that such resins do not adhere well and are unlikely to fill a concrete crack.

In accordance with this screening test, the glycol additives of the present invention were tested. The resin and hardener components were mixed in a weight ratio of 80:20 when the hardener was 1432B (as set forth in Example 1) and in the ratio of 82:18 when the hardener was NAEP. The glycol additive was included, as indicated, in an amount to provide 3% wt in the final epoxy resin composition. The hardener 1432B was prepared as set out in the Example 1.

|  | Hardener | Wt of Mixture (g) |
| --- | --- | --- |
| A. Resin | | |
| Dow D.E.R. 324 | NAEP (Control) | 53.3 (average) |
| Dow D.E.R. 324 | NAEP + Glycerne | 37.3 |
| Dow D.E.R. 324 | NAEP + Ethylene Glycol | 36.4 |
| Dow D.E.R. 324 | NAEP + Diethylene Glycol | 39.3 |
| Dow D.E.R. 324 | NAEP + Triethylene Glycol | 40.9 |
| B. Resin | | |
| Dow D.E.R. 324 | 1432B (Control) | 39.3 |
| Dow D.E.R. 324 | 1432B + Glycerine | 31.6 |
| Dow D.E.R. 324 | 1432B + Ethylene Glycol | 35.1 |
| Dow D.E.R. 324 | 1432B + Diethylene Glycol | 38.6 |
| Dow D.E.R. 324 | 1432B + Triethylene Glycol | 36.3 |

The above data shows that the glycol additive improves the ability of the resin composition to adhere to the substrate as evidenced by the reduction in the weight values . The effect of the glycol additives in the screening test is most pronounced with the NAEP hardener, which is less preferred than the 14328 hardener defined in the previous example . In general, glycerine is the most preferred of the glycol additives.

EXAMPLE 3

The screening test set forth in Example 2 was repeated with resin compositions incorporating a modifier of the polyglycol diepoxide resin type in the resin component. The particular modifier used was Dow D.E.R. 736, which was mixed in a weight ratio of 25:75 with the resin Dow D.E.R. 324. The glycol additives were included in the hardener component in an amount sufficient to provide 3% wt of the total epoxy resin composition. The resin and hardener components were mixed in a weight ratio of 80:20. The weight values are set forth below.

| A. Resin | Hardener | Wt of Mixture (g) |
| --- | --- | --- |
| D.E.R. 324/D.E.R. 736 | 1432B (Control) | 54.9 |
| D.E.R. 324/D.E.R. 736 | 1432B + Glycerine | 39.5 |
| D.E.R. 324/D.E.R. 736 | 1432B + Ethylene Glycol | 50.2 |
| D.E.R. 324/D.E.R. 736 | 1432B + Triethylene Glycol | 52.8 |

Here again, the reduction in weight values shows the improvement in the ability of the resin to adhere to a substrate approximating concrete when the resin composition includes the glycol additive.

It is to be understood that the above-described embodiments of the invention are illustrative only and that modifications will be evident to persons skilled in the art.

What is claimed is:

1. A method of filling cracks in cementitious substrates comprising applying to the area to be filled a composition comprising:

A) a resin component which comprises:
   (a) from about 50% to about 99% by weight of a liquid epoxy resin having a molecular weight of from about 400 to about 1000 daltons which is the product of the reaction of $C_{1-4}$ alkylidene-diphenol and an epihalohydrin,
   (b) from 0 to about 20% by weight of a mono, di, or trifunctional glycidyl ether which is the reaction product of an aliphatic or aromatic polyether and an epihalohydrin,
   (c) from 0 to about 30% by weight of a polyglycol diepoxide,
   (d) from about 1 to about 10% by weight of a polyhydroxy compound selected from the group consisting of glycerine, ethylene glycol, diethylene glycol, and triethylene glycol; and B) a hardener component which comprises:
   (a) from about 60 to about 98% by weight of a curing agent having functional groups capable of effecting crosslinking of the oxirane groups present in said epoxy resin,
   (b) from 0 to about 30% by weight of an accelerator,
   (c) from about 2 to about 10% by weight of a trialkylsilane; wherein the weight ratio of resin component A) to hardener component B) is from about 2:1 to about 4:1.

2. The method of claim 1 wherein said polyhydroxy compound is glycerine.

3. The method of claim 1 wherein said liquid epoxy resin is the product of the reaction of bis-phenol A and epichlorohydrin.

4. The method of claim 1 wherein in component A)(b) said glycidyl ether is a $C_{12-14}$ alkyl glycidyl ether.

5. The method of claim 1 wherein said curing agent is a polyamine.

6. The method of claim 5 wherein said polyamine is a polyoxyalkylene amine, an aminoalkylpiperazine, an amidoamine, an aliphatic primary or secondary amine, wherein said polyamine is present in an amount of from about 70% to about 90% by weight of said hardener component.

7. The method of claim 1 wherein said trialkylsilane is γ-methacryloxpropyl trimethoxy silane, γ-glycidyloxypropyl trimethoxy silane, or β-(3,4-epoxycyclohexylethyl) trimethoxy silane.

8. The method of claim 1 wherein said composition is further comprised of from about 0.1% to about 0.5% by weight of magnesium oxide.

9. A method of filling cracks or joints in cementitious substrates comprising applying to the cracks or joints to be filled an epoxy resin composition comprising:

Component A: a resin component containing from about 50 to about 100% by weight of a liquid epoxy resin having a molecular weight of from about 400 to about 1000 daltons which is the product of the reaction of $C_{1-4}$ alkylidene-diphenol and an epihalohydrin, from 0 to about 30% by weight of a polyglycol diepoxide, and from 0 to about 20% by weight of a mono, di, or trifunctional glycidyl ether which is the reaction produce of an aliphatic or aromatic polyether and an epihalohydrin;

Component B: a hardener component containing from about 60 to about 98% by weight of a curing agent having functional groups capable of effecting crosslinking of the oxirane groups present in said epoxy resin, from 0 to about 30% by weight of an accelerator, and from about 2 to about 10% by weight of a trialkylsilane; and Component C: from about 1 to about 10% by wight, based on the weight of said epoxy resin composition of a polyhydroxy compound selected from the group consisting of glycerine, ethylene glycol, diethylene glycol, and triethylene glycol; and wherein the weight ratio of component A to component B is from about 2:1 to about 4:1.

10. The method of claim 9 wherein in component A from about 60 to about 80% by weight of the liquid epoxy resin is present therein.

11. The method of claim 9 wherein in component B from about 70 to about 90% by weight of the curing agent is present therein.

12. The method of claim 10 wherein in component B from about 70 to about 90% by weight of the curing agent is present therein.

13. The method of claim 9 wherein component A also contains from about 10 to about 20% by weight of a mono, di or trifunctional glycidyl ether which is the reaction product of an aliphatic or aromatic polyether and an epihalohydrin.

14. The method of claims 9 wherein component B also contains from about 0.1 to about 0.5% by weight of a water scavenger.

15. The method of claim 13 wherein component B also contains
from about 0.1 to about 0.5% by weight of a water scavenger.

16. The method of claim 9 wherein in component A said liquid epoxy resin is the product of the reaction of bis-phenol A and epichlorohydrin.

17. The method of claim 13 wherein said glycidyl ether is a $C_{12-14}$ alkyl glycidyl ether.

18. The method of claim 9 wherein in component B said curing agent is a polyamine.

19. The method of claim 18 wherein said polyamine is a polyoxyalkylene amine, an aminoalkylpiperazine, an amidoamine, or an aliphatic primary or secondary amine.

20. The method of claim 14 wherein said trialkylsilane is $\gamma$-methacryloxypropyl trimethoxy silane, $\gamma$-glycidyloxypropyl trimethoxy silane, or $\beta$-(3,4-epoxycyclohexylethyl) trimethoxy silane.

* * * * *